(12) United States Patent  (10) Patent No.: US 7,992,143 B2
Janzen  (45) Date of Patent: Aug. 2, 2011

(54) SYSTEMS AND METHODS OF CREATING AND ACCESSING SOFTWARE SIMULATED COMPUTERS

(75) Inventor: Mark Janzen, Wichita, KS (US)

(73) Assignee: Applianz Technologies, Inc., Wichita, KS (US)

( * ) Notice: Subject to any disclaimer, the term of this patent is extended or adjusted under 35 U.S.C. 154(b) by 721 days.

(21) Appl. No.: 12/030,682

(22) Filed: Feb. 13, 2008

(65) Prior Publication Data

US 2009/0077363 A1 Mar. 19, 2009

Related U.S. Application Data

(63) Continuation of application No. 10/845,414, filed on May 14, 2004, now Pat. No. 7,500,236.

(60) Provisional application No. 60/471,523, filed on May 15, 2003.

(51) Int. Cl.
*G06F 9/445* (2006.01)

(52) U.S. Cl. ........................................ 717/174; 717/109

(58) Field of Classification Search ................... 717/109
See application file for complete search history.

(56) References Cited

U.S. PATENT DOCUMENTS

| | | | |
|---|---|---|---|
| 4,253,145 A | 2/1981 | Goldberg | |
| 4,456,954 A | 6/1984 | Bullions, III et al. | |
| 4,787,031 A | 11/1988 | Karger | |
| 4,811,276 A | 3/1989 | Suga | |
| 4,975,836 A | 12/1990 | Hirosawa et al. | |
| 5,018,064 A | 5/1991 | Nakayama et al. | |
| 5,276,815 A | 1/1994 | Nakashima et al. | |
| 5,313,615 A | 5/1994 | Newman et al. | |
| 5,341,484 A | 8/1994 | Tanaka et al. | |
| 5,361,375 A | 11/1994 | Ogi | |
| 5,381,534 A | 1/1995 | Shi | |
| 5,437,016 A | 7/1995 | Ikegaya et al. | |
| 5,437,033 A | 7/1995 | Inoue et al. | |
| 5,453,980 A | 9/1995 | Van Engelshoven | |
| 5,740,537 A * | 4/1998 | Beming et al. | ................ 455/450 |
| 5,758,124 A | 5/1998 | Ogata et al. | |
| 5,790,120 A | 8/1998 | Lozares et al. | |
| 5,794,062 A | 8/1998 | Baxter | |

(Continued)

OTHER PUBLICATIONS

Connectix Corp., "The Technology of Virtual Machines", Connectix, 2001.*

(Continued)

*Primary Examiner* — Wei Zhen
*Assistant Examiner* — Phillip H Nguyen
(74) *Attorney, Agent, or Firm* — Dickstein Shapiro LLP; Robert G. Gingher, Esq.

(57) ABSTRACT

The system and methods of the present application comprise one or more computers that generate and maintain a plurality of software-simulated computers. Each software-simulated computer is adapted to efficiently run an installed application program. Additional security layers provide access to the installed application through a remote user interface installed on a user's computing device. The system generates a new copy of the software-simulated computer for each user session, that prevents configuration problems from interfering with the proper operation of the application program, thereby consistently running the application in an optimized fashion, regardless of changes made to the software-simulated computer by the user or a virus. These software-simulated computers are unaffected by changes a user makes on their own client device. To this end, the system provides robust, web accessible capabilities to application software that may not have been adapted for use on the Internet.

15 Claims, 11 Drawing Sheets

U.S. PATENT DOCUMENTS

| | | |
|---|---|---|
| 5,802,290 A | 9/1998 | Casselman |
| 5,859,972 A | 1/1999 | Subramaniam et al. |
| 5,966,451 A | 10/1999 | Utsumi |
| 5,974,565 A | 10/1999 | Okuhara et al. |
| 6,058,469 A | 5/2000 | Baxter |
| 6,119,146 A | 9/2000 | Heller et al. |
| 6,173,332 B1 | 1/2001 | Hickman |
| 6,279,046 B1 | 8/2001 | Armstrong et al. |
| 6,286,440 B1 | 9/2001 | Jyringi |
| 6,470,494 B1 | 10/2002 | Chan et al. |
| 6,480,845 B1 | 11/2002 | Egolf et al. |
| 6,496,847 B1 | 12/2002 | Bugnion et al. |
| 6,708,329 B1 | 3/2004 | Whitehill et al. |
| 6,751,737 B1 | 6/2004 | Russell et al. |
| 6,760,630 B2 | 7/2004 | Turnaus |
| 6,832,367 B1 * | 12/2004 | Choi et al. .................... 717/130 |
| 7,080,378 B1 | 7/2006 | Noland et al. |
| 7,577,722 B1 * | 8/2009 | Khandekar et al. ........... 709/220 |
| 7,603,670 B1 * | 10/2009 | van Rietschote ................. 718/1 |
| 2001/0025311 A1 | 9/2001 | Arai et al. |
| 2001/0047415 A1 * | 11/2001 | Skene et al. .................. 709/226 |
| 2002/0002605 A1 | 1/2002 | Honda |
| 2002/0010736 A1 | 1/2002 | Marques et al. |
| 2002/0013802 A1 | 1/2002 | Mori et al. |
| 2002/0016812 A1 | 2/2002 | Uchishiba et al. |
| 2002/0059427 A1 | 5/2002 | Tamaki et al. |
| 2002/0069369 A1 | 6/2002 | Tremain |
| 2002/0087611 A1 | 7/2002 | Tanaka et al. |
| 2002/0091697 A1 | 7/2002 | Huang et al. |
| 2002/0091872 A1 | 7/2002 | Bourke-Dunphy et al. |
| 2002/0124072 A1 | 9/2002 | Tormasov et al. |
| 2002/0144155 A1 | 10/2002 | Bate et al. |
| 2002/0156998 A1 | 10/2002 | Casselman |
| 2002/0174282 A1 | 11/2002 | Murakami et al. |
| 2003/0217131 A1 | 11/2003 | Hodge |
| 2004/0139430 A1 * | 7/2004 | Eatough et al. ............... 717/174 |

OTHER PUBLICATIONS

Sugerman et al. "Virtualizing I/O Devices on VMware Workstation's Hosted Virtual Machine Monitor", 2001.*

* cited by examiner

VPC Lifecycle

```xml
<?xml version="1.0" encoding="utf-8" ?>
<configuration guid="6529C140-F8ED-4F39-964C-07027381A7B0">
- <watchdog>
    <pingEvery>1</pingEvery>
  </watchdog>
- <processes>
  - <process id="Ping" applianzProcess="false">
    - <execution autostart="true">
        <path>cmd</path>
        <shutdown type="FORCE" />
      - <parameters>
          <param>/c ping 127.0.0.1 -n 60</param>
        </parameters>
      </execution>
    </process>
  - <process id="ApplianzVMManager" applianzProcess="true">
    - <execution autostart="true">
        <path>C:\program
          files\applianz\Host\ApplianzVMManager.exe</path>
        <shutdown type="API" />
      - <dependencies>
          <dependOn type="CLOSED">Ping</dependOn>
        </dependencies>
      - <parameters>
          <param>2:00AM</param>
        </parameters>
      </execution>
    </process>
  - <process id="Backup" applianzProcess="false">
    - <execution autostart="true">
        <path>C:\program files\applianz\Host\backup.exe</path>
        <shutdown type="API" />
      - <dependencies>
          <dependOn type="CLOSED">ApplianzVMManager</dependOn>
        </dependencies>
      - <parameters>
          <param>10000 "C:\Program Files\Applianz\vms\applianzlinux"
            "C:\Program Files\Applianz\vms\QB"</param>
          <!-- first param is the max megs and the rest are just files
            to backup    -->
        </parameters>
      </execution>
    </process>
  - <process id="AdminCopy" applianzProcess="false">
    - <execution autostart="true">
        <path>xcopy</path>
        <shutdown type="API" />
      - <dependencies>
          <dependOn type="CLOSED">Backup</dependOn>
        </dependencies>
      - <parameters>
          <param>"C:\Program Files\Applianz\vms\QBAdmin\*.*"
```

FIG. 9A

```xml
      "C:\Program Files\Applianz\vms\QB" /Y</param>
    </parameters>
  </execution>
</process>
<process id="Shutdown" applianzProcess="false">
  <execution autostart="true">
    <path>shutdown</path>
    <shutdown type="API" />
    <dependencies>
      <dependOn type="CLOSED">AdminCopy</dependOn>
    </dependencies>
    <parameters>
      <param>-r -f -t 0</param>
    </parameters>
  </execution>
</process>
<process id="LCDController" applianzProcess="true">
  <execution autostart="true">
    <path>C:\program files\applianz\Host\lcdcontroller.exe</path>
    <shutdown type="API" />
    <dependencies>
      <dependOn type="CLOSED">Ping</dependOn>
    </dependencies>
  </execution>
</process>
<process id="CommandPrompt" applianzProcess="false">
  <execution autostart="true">
    <path>cmd</path>
    <shutdown type="FORCE" />
    <dependencies>
      <dependOn type="CLOSED">Ping</dependOn>
    </dependencies>
  </execution>
</process>
</processes>
</configuration>
```

FIG. 9B

SYSTEMS AND METHODS OF CREATING AND ACCESSING SOFTWARE SIMULATED COMPUTERS

CROSS-REFERENCE TO RELATED APPLICATIONS

This is a continuation application of U.S. patent application Ser. No. 10/845,414, filed May 14, 2004, which claims the benefit of U.S. Provisional Application No. 60/471,523, filed on May 15, 2003, each of which is hereby incorporated by reference for each of its teachings and embodiments.

FIELD OF THE INVENTION

This invention relates to the field of virtual computer servers. In particular, it relates to a computer that serves virtual computers on demand.

BACKGROUND OF THE INVENTION

With the advent of the personal computer and networking technologies, client/server application programs were written that helped to improve worker productivity in small and medium sized companies. Since most such companies lacked the resources to staff an Information Technology Department, and could not generate their own customized applications, most companies implemented standardized application program packages at a fraction of their development cost.

However, the computer technology industry has been rapidly evolving over the course of the last decade. Networking technologies that once dominated the industry have been supplanted by TCP/IP, the communication protocol that underlies the ubiquitous World-Wide-Web and the Internet. However, networks often suffer from a wide variety of problems that can directly impact application software performance. Consequently, users depend upon technical support personnel to troubleshoot and repair countless system problems that may arise from these network related problems that prevent users from accessing application programs, such as viruses or denial of service attacks.

In addition, new computer languages, such as Java, have developed to implement new technologies in the present Internet computing paradigm. But application programs that were written before such languages were even conceived cannot take advantage of the functionality provided by such new computer languages.

In addition, many standardized application programs were designed to run on communication protocols that are incompatible with TCP/IP. Unfortunately, these application program packages may also have been designed on an older client/server model and not an Internet-based model. Consequently, a complete source code rewrite for these application programs would be necessary to implement them in a modern Internet-based computing paradigm. Such a rewrite would not only be cost prohibitive, but might also exceed a mid-sized business's resources. Further, the application program may no longer be supported by the original software developers and vendors. A mid-sized company that wishes to improve their access to key computer applications would be faced with a dilemma of either purchasing a new application program and incurring the additional cost of converting data accumulated over many years into a new format used by such a new application program, or incurring the maintenance expense for a legacy application program and forsaking the freedom of accessing the application through the ubiquitous Internet.

Therefore, there exists a need for a computing platform that can transform older, legacy applications into a modern-day, Internet-based application without bearing the expense and effort of rewriting source code. In addition, there exists a need for a robust platform that provides a consistent application program performance without being affected by changes made by a user, a virus, or other malicious software such as Trojan horses, spyware, or adware.

BRIEF SUMMARY OF THE INVENTION

The system and methods of the present application comprise one or more computers that generate and maintain a plurality of software-simulated computers. Each software-simulated computer is adapted to efficiently run an installed application program. Additional security layers provide access to the installed application through a remote user interface installed on a user's computing device. The system generates a new copy of the software-simulated computer for each user session, which prevents configuration problems from interfering with the proper operation of the application program, thereby consistently running the application in an optimized fashion, regardless of changes made to the software-simulated computer by the user or a virus. These software-simulated computers are unaffected by changes a user makes on their own client device. To this end, the system provides robust, web accessible capabilities to application software that may not have been adapted for use on the Internet.

In one aspect, the present invention is directed to a method of deploying and remotely accessing a plurality of software-simulated computers, comprising:

creating a software-simulated computer image, said image comprising:
  simulated hardware device specifications;
  a bootable application;
  a guest process manager, and;
  one or more application programs;
cloning said image to create said plurality of software-simulated computers;
branding each software simulated computer in said plurality with unique, machine-differentiation information;
selecting a software-simulated computer in said plurality; and
establishing communications for remote access across a network to said selected software-simulated computer.

In another aspect of the present invention, said step of branding prevents communication conflicts between machines on said network.

In another aspect of the present invention, said bootable application is a Windows variant, and said machine differentiation information includes a system identifier.

In another aspect of the present invention, the method further comprises: loading user specific information into said image before performing said cloning step.

In another aspect of the present invention, said user specific information comprises software license numbers.

In another aspect of the present invention, said user specific information includes one or more of company names and individual names.

In another aspect of the present invention, said user specific information includes user identifiers and associated passwords.

In another aspect of the present invention, said branding prevents conflicts between machines on said network.

In another aspect of the present invention, the method further comprises booting each software-simulated computer.

In another aspect of the present invention, the method further comprises evaluating quality of said communications and selecting a remote control communications protocol based on said quality.

In another aspect of the present invention, the method further comprises accessing said selected software-simulated computer through a remote user interface.

In another aspect of the present invention, the method further comprises configuring a firewall to permit communications with said selected software-simulated computer.

In another aspect, the present invention is directed to a method of creating one or more software-simulated computers on a remote computer, comprising:

creating one or more software-simulated computer images;
generating a package comprising said images; and
delivering said package to said remote computer, wherein said remote computer extracts said images and automatically creates said software-simulated computers.

In another aspect of the present invention, said package includes an xml document comprising installation instructions and said remote computer generates said software-simulated computers in accordance with said instructions.

In another aspect of the present invention, said package is encrypted.

In another aspect of the present invention, each of said images comprises:

simulated hardware device specifications;
a bootable application;
a guest process manager, and;
one or more application programs.

In another aspect of the present invention, one of said images represents a server computer.

In another aspect of the present invention, one of said images represents a firewall computer.

In another aspect, the present invention is directed to a software-simulated computer server for providing a client device access to an application program on a software-simulated computer through a network, comprising:

one or more hardware computers;
an image that defines a software-simulated computer having a copy of said application program stored thereon; and
a host control program that causes said one or more hardware computers to create a plurality of software-simulated computers from said image and to generate unique, machine-differentiation information for each software-simulated computer in said plurality;
wherein said host control program further causes said hardware computers to select a software-simulated computer from said plurality, to negotiate a communications connection between said selected software-simulated computer and said client device, and to enable said client device to access said application program running on said selected software-simulated computer through said network.

In another aspect of the present invention, said host control program causes said one or more hardware computers to shutdown, recreate, and restart said plurality of software-simulated computers.

In another aspect of the present invention, said host control program further causes said one or more hardware computers to copy user generated data to backup storage.

In another aspect of the present invention, said host control program recreates and restarts said plurality of software-simulated computers after said user generated data has been copied.

In another aspect of the present invention, said host control program responds to client device requests using one or more communication protocols from a list comprising FTP, HTTP, HTTPS, MPLS, SFTP, SMTP, and SSH.

In another aspect of the present invention, said application program is designed to be used on a single personal computer.

In another aspect of the present invention, said application program is a client/server application.

In another aspect of the present invention, said application program uses one or more communication protocols from a list consisting of IPX/SPX, netbios, raw IP sockets, UDP/IP, TCP/IP, IPv6, IPSEC, HTTP, and netbeui.

In another aspect of the present invention, said host control program balances load on said hardware computers when making said selection of said software-simulated computer.

In another aspect of the present invention, said load is determined by one or more of available memory, processor utilization, and a number of unused software-simulated computers.

In another aspect of the present invention, said software-simulated computer is adapted to accept and communicate with and to provide concurrent interaction of said application with more than one client device.

In another aspect of the present invention, said software-simulated computer is adapted to record user input from said client device.

In another aspect of the present invention, the software-simulated computer server further comprises a control center computer in communication with a host control virtual computer, wherein said control center computer transmits said image for said software simulated computer to said host control virtual computer.

In another aspect of the present invention, said control center computer receives status information about a software-simulated computer.

In another aspect of the present invention, said control center computer is adapted to issue a reboot command that causes a particular software-simulated computer to be shutdown, recreated, and restarted.

In another aspect of the present invention, said control center computer transmits an updated image comprising an updated copy of said application program and said host control program causes said one or more hardware computers to shutdown, recreate using said updated image, and restart said plurality of software-simulated computers.

In another aspect, the present invention is directed to a media storing a computer program that causes a processor that executes said program to perform a method of deploying and remotely accessing a plurality of software-simulated computers, the steps comprising:

cloning an image that defines a software simulated computer to create said plurality of software-simulated computers;
branding each software simulated computer in said plurality with unique, machine-differentiation information;
selecting a software-simulated computer in said plurality; and
establishing communications for remote access across a network to said selected software-simulated computer.

In another aspect of the present invention, said computer program causes said processor to perform steps comprising: loading user specific information into said image before performing said cloning step.

In another aspect of the present invention, said computer program causes said processor to perform steps comprising: evaluating quality of said communications and selecting a remote control client based on said quality.

In another aspect of the present invention, said computer program causes said processor to perform steps comprising: configuring a firewall to permit communications with said selected software-simulated computer.

BRIEF DESCRIPTION OF THE DRAWINGS

FIGS. 9A and B are an XML listing illustrating instructions for a watchdog process.

DETAILED DESCRIPTION OF THE INVENTION

Figure 1:
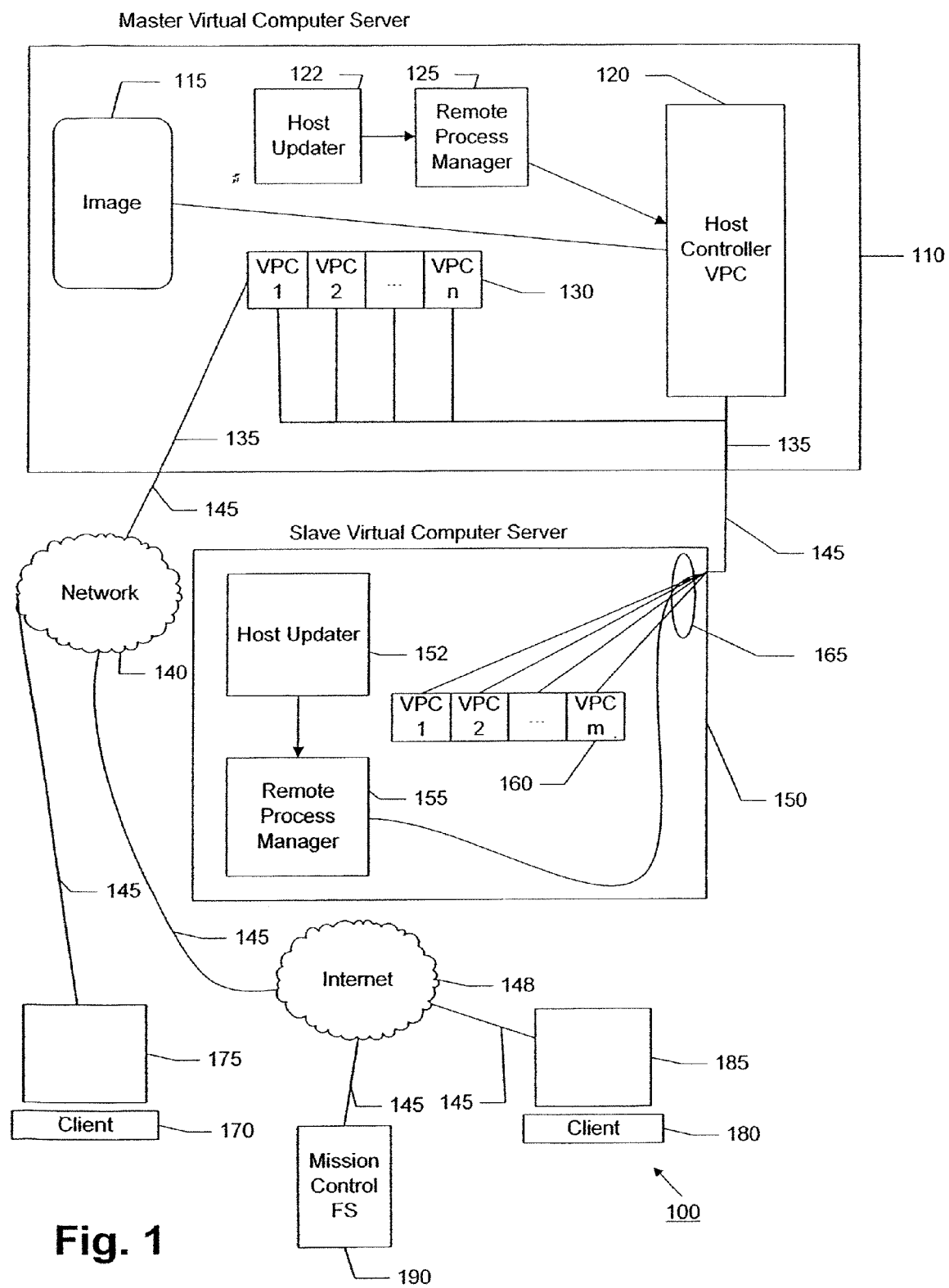
FIG. 1 is a block diagram that illustrates a system that serves virtual computers and provides a client device access to an application program on such virtual computers through a network.

The present invention comprises a system and methods for serving virtual personal computers (VPCs). The system provides a means for a computer user to access an application without installing the application on her client computing device. The system also provides a means for the user to access the application from any location where a communications connection can be established with the system. One with skill in the art will understand that this system provides a centralized means for administering the distribution and operation of computer applications, which improves application reliability and increases employee productivity.

Although the invention has been described herein as a system and method for serving VPCs, one of ordinary skill in the art will appreciate that the invention is not so limited (e.g., may be used as system for maintaining a local area network (LAN)) and may include any modification that permits interoperability of a legacy personal computer application with other modern computer networks and interfaces. For example, a prior art client/server application utilizing Novell Netware's™ IPX/SPX communication protocol can be installed in this system and run over the Internet (which uses a completely different communication protocol, namely TCP/IP) without any modification to the application and despite whether the application was designed for Internet accessibility.

Furthermore, it should be understood that the detailed description and specific examples, while indicating exemplary embodiments of the present invention, are given for purposes of illustration only and not for limitation. Although the present invention described herein principally details exemplary traditional client/server applications, it should be appreciated that this system is not so limited and would accommodate single-user or standalone applications as well.

Additionally, the present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements. Preferably, the computer code used to provide the described functionality is developed with Microsoft Visual Studio. The computer code is preferably programmed in Visual Basic 6, C, C++, C#, Visual Basic .NET, and Transact SQL. The object code created can be executed by any computer having a Windows™ 2000 or higher operating system and the Microsoft .NET Framework™ version 1.1, and VMWare Workstation™ version 4.05 or higher.

Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

System Architecture

FIG. 1 is a block diagram illustrating a preferred embodiment for serving virtual personal computers (VPCs), also known as software-simulated computers. As shown in FIG. 1, system architecture 100 preferably comprises a master virtual computer server 110, zero or more slave virtual computer servers 150, a network 140, a client device 170 and physical communication connections 145.

In addition, system architecture 100 may also include a connection to Internet 148 and a remote client device 180, attached to Internet 148.

A collection of fileservers and databases, collectively known as Mission Control 190, described in further detail in connection with FIG. 7 below, may also be part of system architecture 100, and may be used to monitor operation of system 100.

Master virtual computer server 110 is preferably coupled to slave virtual computer server 150 through one or more network communications lines 145. Although FIG. 1 illustrates master virtual computer server 110 and slave virtual computer server 150 as distinct computers, one skilled in the art will recognize that master virtual computer server 110 and slave virtual computer server 150 may, for example, be implemented in a single hardware computer having one or more processors, and may be implemented as concurrently processed applications running in said master virtual computer server 110 and slave virtual computer server 150.

Master virtual computer server 110 and slave virtual computer server 150 are preferably dedicated, high-performance computers adapted to serve VPCs to a user. These servers 110/150 comprise a processor, storage, and communications interfaces sufficient to network these computers with client devices 170 and/or 180. Preferably, virtual computer servers 110/150 comprise AMD Opteron 144 processors, 4 GB of ECC RAM, and mirrored 10K SATA hard drives.

In a preferred embodiment, master virtual computer server 110 comprises an image 115, a host controller VPC 120, a host updater program 122, a remote process manager (RPM) 125, and one or more VPCs 130.

In addition, master virtual computer server 110 comprises many virtual communication connections 135, some of which are illustrated in FIG. 1. In a preferred embodiment, virtual communication connections 135/165 are virtual hubs, switches, and connections that are created with VMWare's VMNet bridge protocol program, or similar virtual network creation software.

Image 115 is a data file that contains information that describes a VPC. Further description of image 115 is presented below in connection with FIG. 2. Images are preferably created at Mission Control 190, as described below. Alternatively, an image author may also generate images for use in system 100 or server 110.

Host controller VPC 120 is a virtual computer that contains a program known as a host controller program. Host controller VPC 120, through the host controller program, is responsible for managing virtual computers in master virtual computer server 110 and slave virtual computer server 150 as described below.

Host updater 122 is a short program that fetches a copy of RPM 125 from host controller VPC 120, loads it into master virtual computer server 110's memory, and starts RPM 125.

RPM 125 is a program that manages processes running on master virtual computer server 110. RPM 125 starts, stops, suspends, and monitors these processes, and follows instructions received from host controller VPC 120.

In a preferred embodiment, slave virtual computer server 150 comprises a host updater 152, a remote process manager 155, and one or more VPCs 160. In addition, slave virtual computer server 150 further comprises virtual communication connections 165, some of which are illustrated in FIG. 1.

Like master virtual computer server 110, slave virtual computer server 150's RPM 155 is a program responsible for managing processes on slave virtual computer server 150.

Similarly, host updater 152 is a short program that fetches a copy of RPM 155 from host controller VPC 120, loads it into slave virtual computer server 150's memory, and starts RPM 155.

FIG. 1 illustrates a client device 170 that contains a remote user interface program 175. Remote user interface program 175 enables client device 170 to interact with a VPC on master virtual computer server 110 or slave virtual computer server 150. This interaction takes place through network 140.

FIG. 1 illustrates a remote client device 180, which also contains a remote user interface program 185 that enables device 180 to interact with VPCs on servers 110 and/or 150. Remote client device 180 is connected to servers 110/150 through Internet 148 merely for illustrative purposes. One skilled in the art will appreciate that network 140 and such connection between remote client device 180 may include any system for exchanging data, such as an Intranet, an Extranet, WAN, LAN, satellite communications, and/or the like.

Client devices 170/180 include any computing device such as a keyboard, mouse, kiosk, personal digital assistant, hand held computer (e.g., Palm Pilot™), cellular phone and/or the like. Similarly, the invention could be used in conjunction with any type of personal computer, network computer, workstation, mini-computer, mainframe, video game system or the like running any operating system such as any versions of Windows, Windows NT, Windows 2000, Windows 2003, Windows 98, Windows 95, Windows XP, Windows XP embedded, MAC OS, OS/2, BEOS, Linux, UNIX, or the like.

Moreover, although the invention is frequently described herein as being implemented with TCP/IP communications protocols, it will be readily understood that the invention could also be implemented using IPX/SPX, Appletalk, Netbios, raw IP sockets, UDP/IP, IP v6, IP sec, Netbeui, FTP, HTTP, HTTPS, SFTP, SMTP, and SSH, or any number of existing or future communication protocols.

Figure 2:
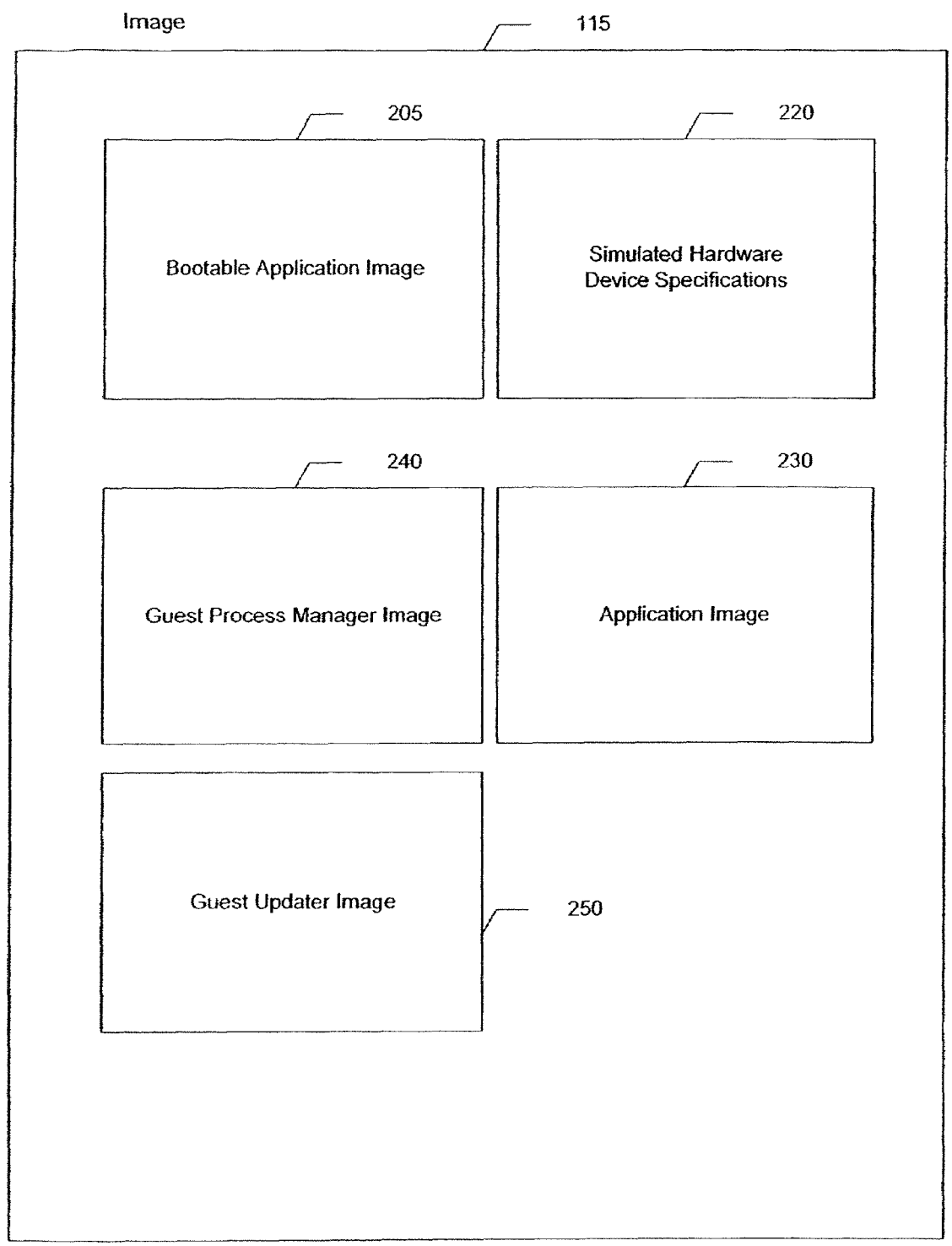
FIG. 2 is a block diagram that illustrates an image for a virtual computer.

FIG. 2 illustrates an image for generating a VPC. Image 115 comprises a bootable application image 205, simulated hardware device specifications 220, an application image 230, a guest process manager image 240, and a guest updater image 250.

Bootable application image 205 is a copy of an operating system or some other application that can be run by a personal computer at boot time. Such a bootable application can be, for example, Windows, Linux, or one of the aforementioned operating systems.

Simulated hardware device specifications 220 comprise specifications that define simulated hardware on a VPC. Such specifications include specifications for a hard disk storage device, random access memory, a processor, and interfaces such as parallel or serial ports, Ethernet network interface cards, video cards, keyboards, or mouse interfaces.

Guest process manager image 230 is a copy of a program that manages other processes on the VPC. Guest process manager represents an application program that runs under the auspices of a boot application.

Application image 215 is a copy of any computer program designed to run on a personal computer. Application image 215 is therefore designed to run under the auspices of a boot application. Application image 215 also is invoked by a guest process manager.

Figure 3A:
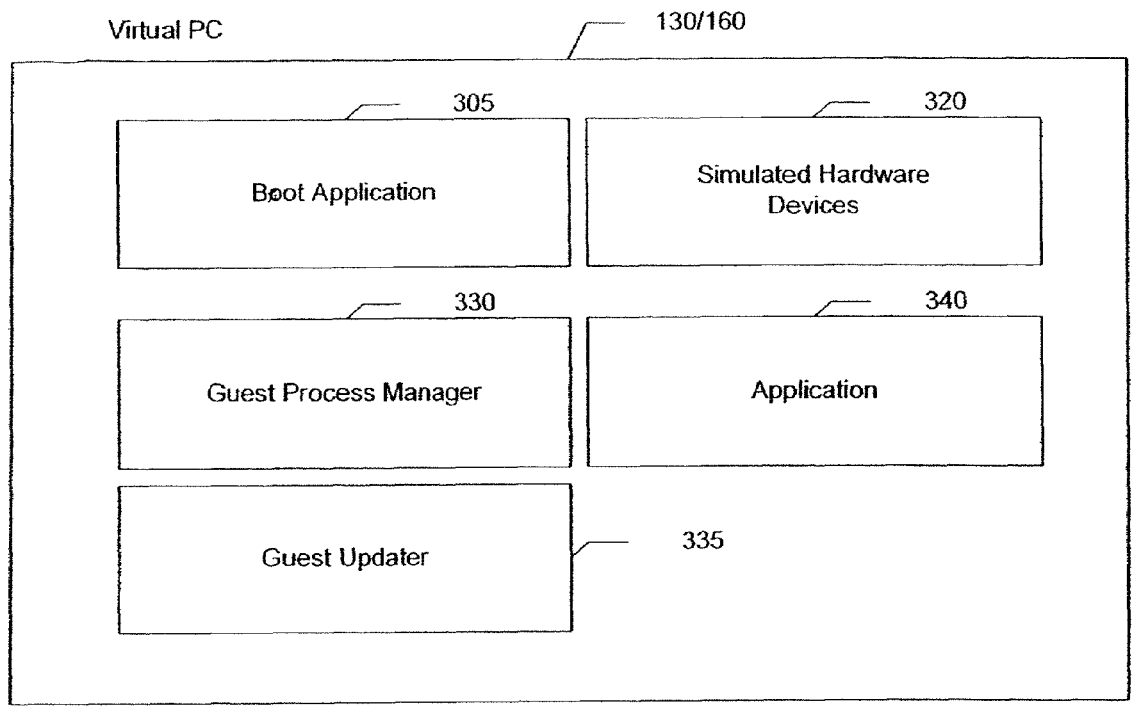
FIG. 3A is a block diagram that illustrates a virtual computer.
Figure 3B:
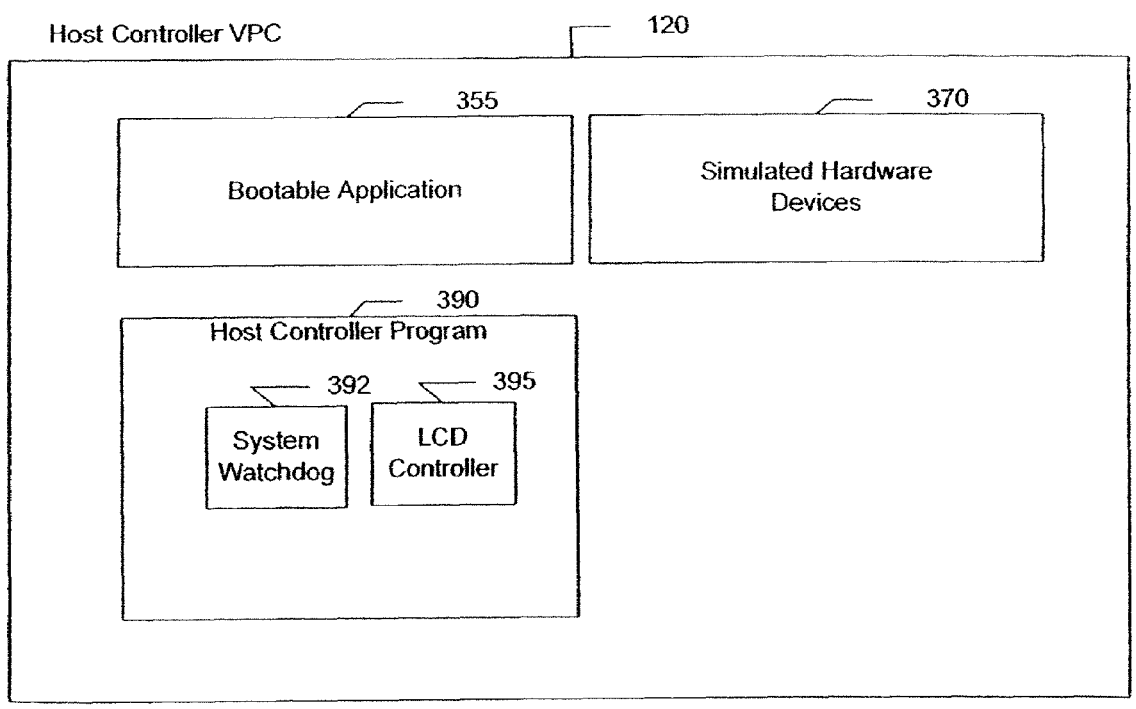
FIG. 3B is a block diagram that illustrates a host controller virtual computer.

FIGS. 3A and 3B illustrate a generic VPC 130/160 and a host controller VPC 120, respectively. VPCs 130/160 are generated from images loaded into master virtual computer server 110 or slave virtual computer server 150, as described in more detail below. Host controller VPC 120 is generated from an image loaded into master virtual computer server 110.

FIG. 3A illustrates a VPC 130/160. As shown in FIG. 3A, VPC 130/160 comprises a bootable application 305, simulated hardware devices 320, a guest process manager 330, a guest updater 335 and one or more application programs 340.

Bootable application 305 is generated from boot application image 205, and comprises an operating system used to run VPC 130/160. Simulated hardware devices 320 are generated from simulated hardware device specifications 220, and represent virtual hardware devices in VPC 130/160.

Guest process manager 330 is a special application that runs under the auspices of boot application 305. Guest process manager 330 monitors the processors running on VPC 130/160, starts said processes, stops said processes, and generally maintains said processes. Guest process manager 330 accepts commands and executes orders from host controller program 390.

Guest updater 335 is a short program fetches a copy of guest process manager 330 from host controller VPC 120 at boot time, loads it into VPC 130/160's virtual memory, and executes it.

Application 340 is a computer program that runs under the auspices of boot application 305. Application 340 can be, but is not limited to a program, an active X component that runs on a web browser, or a java applet that runs on a web browser Typically, application 340 may authenticate a user by query for a product key code or by other means. Such authentication is described in a system operation section below.

Turning to FIG. 3B, host controller VPC 120 comprises a bootable application 355, simulated hardware devices 370, and a host controller program 390.

Bootable application 355 is generated from boot application image 205, and comprises an operating system used to run host controller VPC 120. Simulated hardware devices 370 are generated from simulated hardware device specifications 220, and represent virtual hardware devices in host controller VPC 120.

Host controller program 390 is an application program that runs under the auspices of boot application 355. Host controller program 390 performs functions such as creating VPCs, deleting VPCs, cloning VPCs, and managing VPCs in master virtual computer server 110 and slave virtual computer server 150 as well as reporting status and control information. Host controller program 390's functions are described in more detail in connection with system 100's operation below.

Figure 4:
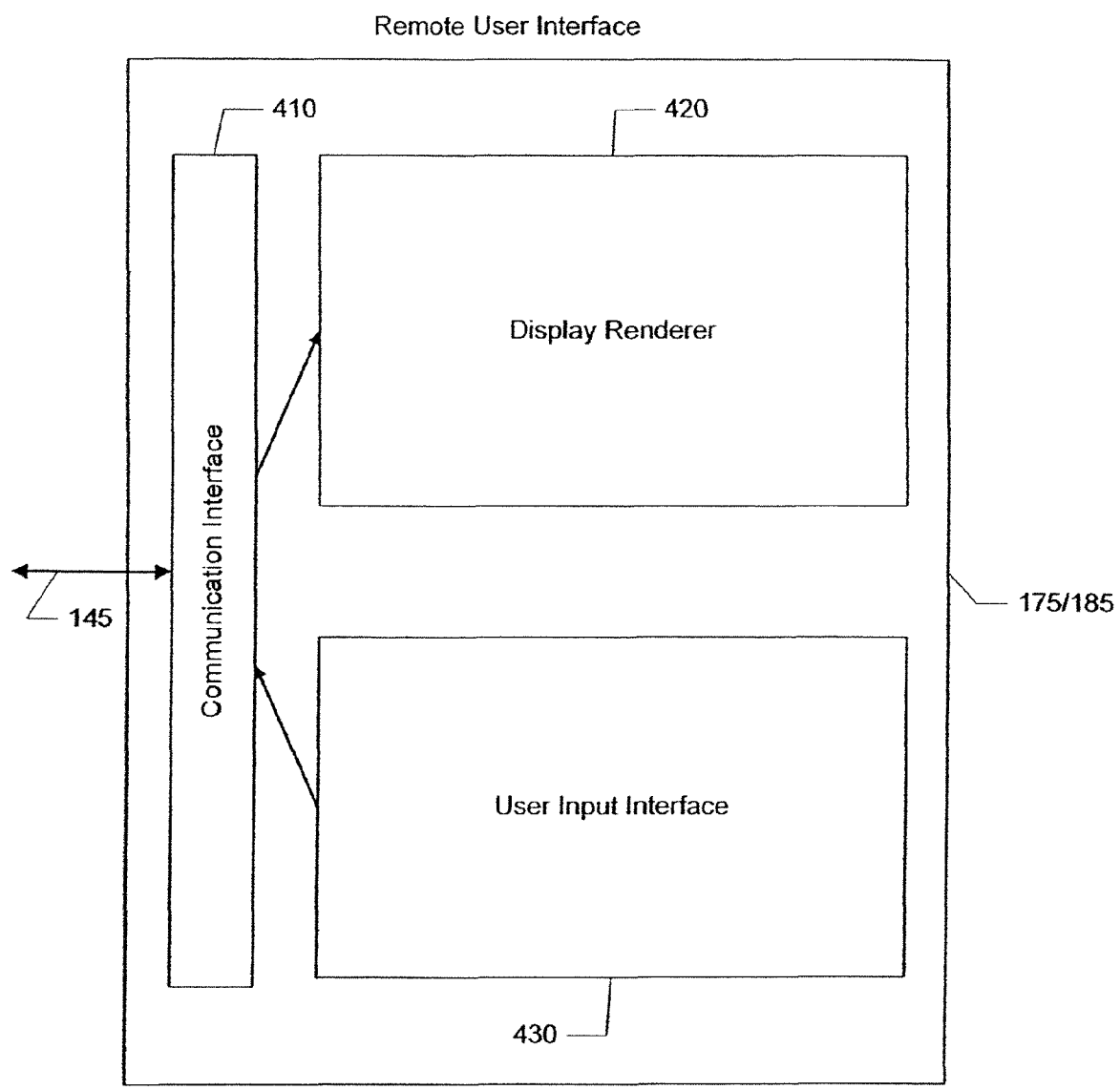
FIG. 4 is a block diagram that illustrates remote user interface components.

FIG. 4 illustrates a remote user interface 175/185. Remote user interface 175/185 comprises a communication interface 410, a display renderer 420, and a user input interface 430.

Communication interface 410 is a program module that communicates with user input interface 430 and display renderer 420. Communication interface also communicates with other devices via network link 145. Communication interface 410 receives user input from user input interface 430 and either recasts it as a request to a VPC or passes it on to display renderer 420.

Display renderer 420 is a program module that places information on a display of client device 170/180. Display renderer 420 provides a view of data received and renders a facsimile of a screen that application 340 would present to a user.

User input interface 430 is a program module that receives user input. Such input would normally be provided by the user interacting with application 340, such as keystrokes, mouse commands, etc.

In summary, remote user interface 175/185 creates a convincing illusion that the user is interacting with an application program installed on client device 170/180. One with skill in the art would know that remote user interface 175/185 can be implemented with generic, off-the-shelf software, or by a custom application. In a preferred embodiment, remote user interface is implemented through a combination of code to communicate with host controller program 390 and either a web browser, Microsoft Remote Desktop, VNC, or similar desktop remote user interface technology.

Communication between remote user interface 175/185 and servers 110/150 is accomplished through any suitable communication means, such as, for example, a telephone network, Intranet, Internet 148, point of interaction device (point of sale device, personal digital assistant, cellular phone, kiosk, etc.), online communications, off-line communications, wireless communications, and/or the like.

System Operation

The following discussion describes system functions performed by host controller program 390. Preferably, host controller program 390 is running on host controller VPC 120, but alternatively may be run as a stand-alone process in servers 110/150. In such event, it should be understood that references to host controller VPC 120 also comprise the activities of host controller program 390, and such terms are to be considered interchangeable.

Figure 5:
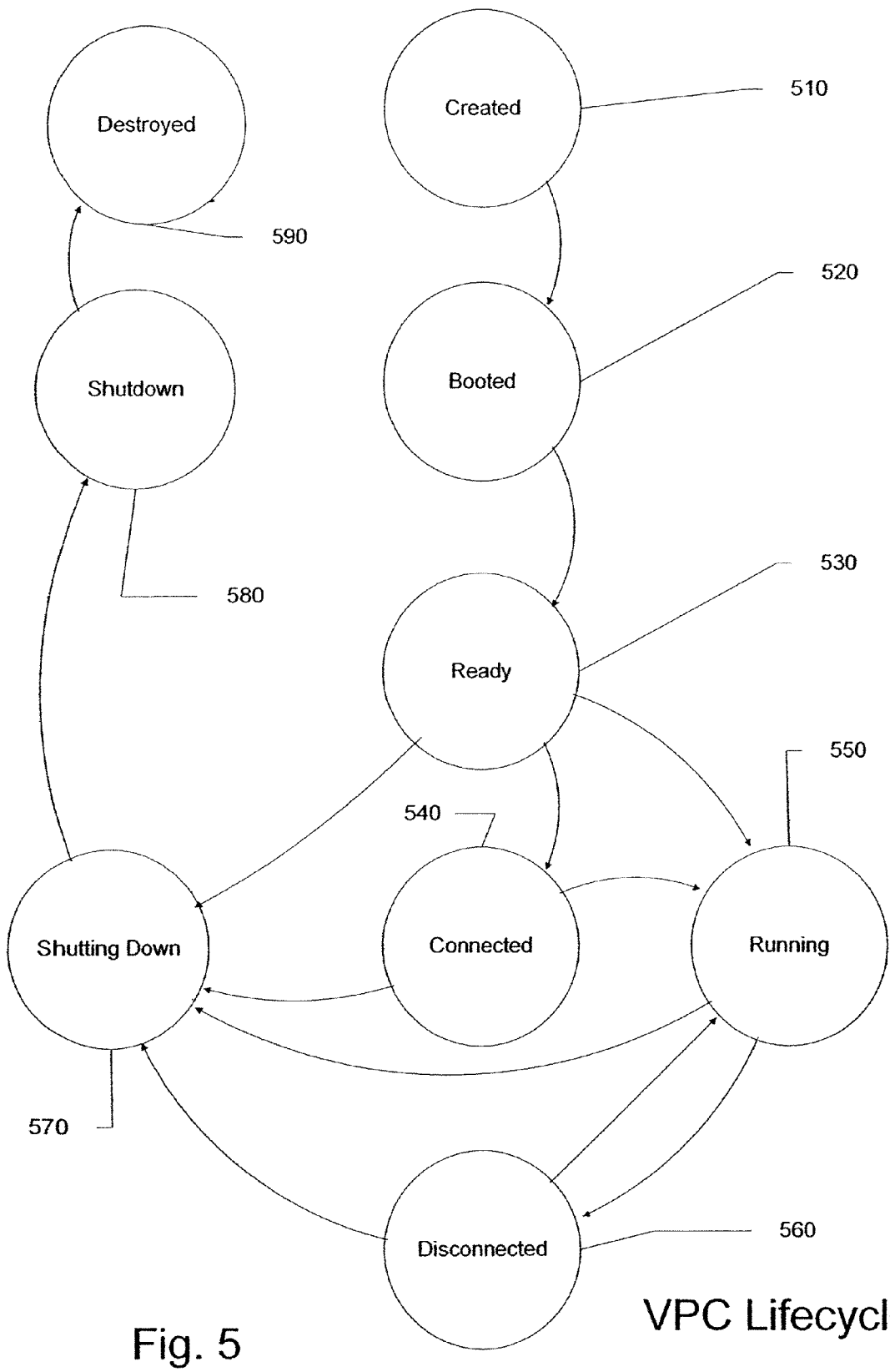
FIG. 5 is a state diagram that illustrates a virtual computer's life cycle.

FIG. 5 is a state diagram that illustrates a life cycle of a VPC. As shown in FIG. 5, initially a VPC starts out in a created state 510. Next, the VPC transitions to a booted state 520. Once the VPC has booted, it establishes communications with host controller VPC 120, and then transitions into a ready state 530 once such communications have been established.

While in ready state 530, the VPC is available for users to connect to it. It also listens to host controller VPC 120 for any commands and updates host controller VPC with its status. In order for a user to connect to VPC 130/160 and use application 340, application 340 typically authenticates a user by querying a product key code or it may display a list of products that have a registered license and that provide access to the user. The user may connect to as many products as there are licenses, however, application 340 may have other constraints, e.g., it may only allow only a single login per user.

Once a user has selected an application 340, remote user interface 175/185 attempts to connect to master virtual computer server 110 in general, and host controller VPC 120 in particular. If host controller VPC 120 is not located (at the last known IP address), remote user interface 175/185 will query Mission Control 190 for network connection information. In response, Mission Control 190 returns one or more IP addresses where host controller VPC 120 may be found. Remote user interface 175/185 then tries the returned information until it establishes communications with host controller VPC 120.

Remote user interface 175/185 queries host controller VPC 120 for the network connection information of a VPC from the plurality of VPCs 130/160 that has a required application 340. Host controller VPC 120 selects the VPC based on load balancing considerations. Such considerations include the amount of available memory the processor utilization, and/or the number of ready VPCs in server 110/150. If no VPCs are ready, host controller VPC 120 will create another VPC. If the maximum number of VPCs for application 340 are already running, host controller VPC 120 returns a message to remote user interface 175/185 that no more sessions are available. If application 340 is not present on servers 110/150, then host controller VPC 120 returns a message that such application was not found.

Then, host controller VPC 120 returns the necessary information, such as the IP address, port number, and communication protocols for the selected VPC 130/160. Preferably, host controller VPC 120 ensures that remote user interface 175/185 connects to the selected VPC 130/160 by creating internal communication paths 135/165 to the selected VPC and by reconfiguring other VPCs, such as a firewall VPC, as described below.

Once a user connects to the selected VPC, the VPC transitions to connected state 540. While in connected state 540, the VPC informs host controller VPC 120 that a user has connected to it and then it transitions to running state 550.

While in running state 550, several scripts and programs are executed in response to commands issued by host controller VPC. For example, such scripts may map network drives or change environment settings for the application's use when establishing a connection with a fileserver. But, primarily the connected user interacts with application program 340 while the VPC is in running state 550.

In a preferred embodiment, more than one client device 170/180 can connect with a VPC, for collaboration projects, video conferencing, etc. In yet another preferred embodiment, user input is re-ordered so that it can be used later, e.g., for demonstrative purposes.

While in running state 550, the user may download files from the selected VPC to her computing device 170/180. During such file transfers, if the communications protocol does not provide a direct way of effecting the transfer, host controller VPC 120 may broker the transfer in a two-step process. In the first step, host controller VPC 120 uses the communications protocol to receive the file and to temporarily store the file. Then, in the second step, host controller VPC 120 transfers the file to the destination. In a preferred embodiment, these transfers are effected in a secure, encrypted manner and authenticated by host controller VPC 120.

In addition, if a user requests printing, the print job is transmitted to computing device 170/180, where the user chooses which printer to use and any other commonly toggled printing options necessary to direct the printed document's output.

The user may complete his task and disconnect from the VPC in running state 550. When this occurs, the VPC transitions to a disconnected state 560. While in disconnected state 560, the VPC notifies host controller VPC 120 that the user has disconnected from it and awaits further instructions from host controller VPC 120.

If the user temporarily loses the communication connection between remote user interface 175/185 and the selected VPC, the VPC transitions to disconnected state 560 from running state 550. Remote user interface 175/185 requests reconnection to the very same selected VPC from host controller VPC 120. If the connection cannot be reestablished, host controller VPC 120 informs remote user interface 175/185, shuts down the selected VPC as described below, and negotiates a new connection with another VPC selected from VPCs 130/160.

In response to a user's request, or if a user logs out, the VPC may also transition from running state 550 to a shutting down state 570. In either case, the VPC informs host controller VPC 120 of the change in state. The VPC may also transition to shutting down state 570 from disconnected state 560 or connected state 540 in response to commands from host controller VPC 120.

While in shutting down state 570, the VPC proceeds to perform an orderly shutdown. The VPC warns any connected users of the shutdown. Then the VPC transitions to shutdown state 580. In addition, if host controller VPC 120 notes that the VPC is taking too long to shutdown, host controller VPC 120 cleans up the faulty shutdown and ensures that the VPC properly transitions to shutdown state 580.

In shutdown state 580, the VPC is unable to communicate with host controller VPC 120 for any further commands. When host controller VPC 120 deletes the VPC, the VPC transitions to a destroyed state 590.

Master virtual computer server 110's operation is now described in terms of its components, but this description also applies to equivalent components found in slave computer server 150 unless otherwise indicated. When a virtual computer server is turned on, the machine boots up in a native operating system installed in the server's boot device. Next, host updater 122 determines whether the server is a master or slave, based on a configuration file stored in the server (not shown). If the virtual computer server is a master, host updater 122 generates and launches host controller VPC 120. Once host control VPC 120 has booted up, host updater 122 establishes communications with host controller VPC 120.

If the virtual computer server is a slave, then host updater 152 waits for a host controller VPC 120 to boot up on a master virtual computer server 110. Once host controller VPC 120 is running, host updaters 122 and 152 download software required to run RPMs 125 and 155, respectively. Then, host updaters 122 and 152 execute RPM 125 and 155 in servers 110 and 150 respectively.

As stated above, RPMs 125 and 155 are programs that control the operation of processes in master virtual computer server 110 and slave virtual computer server 150, respectively. RPMs 125 and 155 are in communication with host control VPC 120. RPMs 125 and 155 are responsible for starting processes, stopping processes and monitoring processes. RPMs 125 and 155 also check the health of virtual computer servers 110/150, check for remote login into any computer server via any kind of remote shell or control program, and performing other general security functions. Communications between RPMs 125 and 155 and host control VPC 120 are accomplished various different communication transport protocols. Preferably HTTP is used, but .NET remote computing, JAVA RMI, virtualization software (VM ware, virtual PC, etc.) hidden communication paths, or the like may be used.

In a preferred embodiment, host updater 122/152 and RPM 125/155 monitors the status of host controller VPC 120 and a special VPC known as a firewall VPC, which is described in more detail below. If a significant period of time has passed since the start up of either host controller VPC 120 or firewall VPC, and communications have not been properly established, host updater 122/152 and/or RPM 125/155 configures the native OS with communication parameters or make a DHCP request, and then reports the trouble back to Mission Control 190, so that a technician can take corrective action.

Once communications have been established between host controller VPC 120 and RPMs 125 and 155, host controller VPC 120 issues commands and receives events from these RPMs. A typical command issued by host controller VPC 120 is, for example, to launch a VPC that is configured as a firewall. Such a firewall boots up and report back to host controller VPC 120 that it is up and running and is configured.

Host controller VPC 120 creates one or more VPCs (illustrated as 1 through N in FIG. 1) on master virtual computer server 110 and one or more VPCs (illustrated as 1 through M) on slave virtual computer server 150 by issuing commands to RPMs 125 and 155. Host control VPC 120 uses image 115's and other instructions described below in connection with a package contents to determine the components contained in VPCs 130/160.

In a preferred embodiment, the first VPC generated after host controller VPC 120 in master virtual computer server 110 is a firewall, indicated as VPC1 in VPC plurality 130, shown in FIG. 1. After the firewall VPC is up and running, all communications between client devices and selected VPCs must pass through this firewall VPC, as illustrated in FIG. 1. In this way, firewall VPC maintains the security of the access to VPCs in system 100. Firewall VPC can be reconfigured at any time by host controller VPC 120. Typical configuration settings include required parameters such as an IP address, subnet mask, gateway address, etc. In addition, host controller VPC 120 may cause firewall VPC to perform tasks such as establishing trusted subnets for remote connections, opening ports, closing ports, and setting up network address and port translation of received data packets. This design provides additional security functionality heretofore unavailable with an unmonitored hardware firewall solution.

In a preferred embodiment, one of the VPCs created by host controller VPC 120 is a fileserver. Fileserver VPC preferably contains databases used by a client/server application, and may employ communication protocols incompatible with TCP/IP. Access to the fileserver VPC is achieved by client device 170/180 through a selected VPC. In this manner, the client/server paradigm is virtualized in servers 110/150, and the client side user interface is presented to the user through remote user interface 175/185. Even a TCP/IP incompatible client/server application becomes an Internet-ready application without rewriting a single line of application source code!

In a preferred embodiment, fileserver VPC has a Linux OS with an installed Samba server. Alternatively, fileserver VPC may have a Windows XP/XP embedded/2000/2003 operating system, depending upon the requirements of the different applications that run on the other VPCs. In another variation, fileserver VPC may be, e.g., a database server, or a hardware-device server, for example, a fax server, modem server, or an IP telephony server. In addition, fileserver VPC and the other application VPCs may comprise different versions of guest process manager 330.

In a preferred embodiment, image 115 is stored at Mission Control 190. Typically, image 115 is delivered to master virtual computer server 110 through Internet 148 via communication lines 145, but image 115 may also be installed from media (depicted in FIG. 9 below) in servers 110/150.

Figure 6:
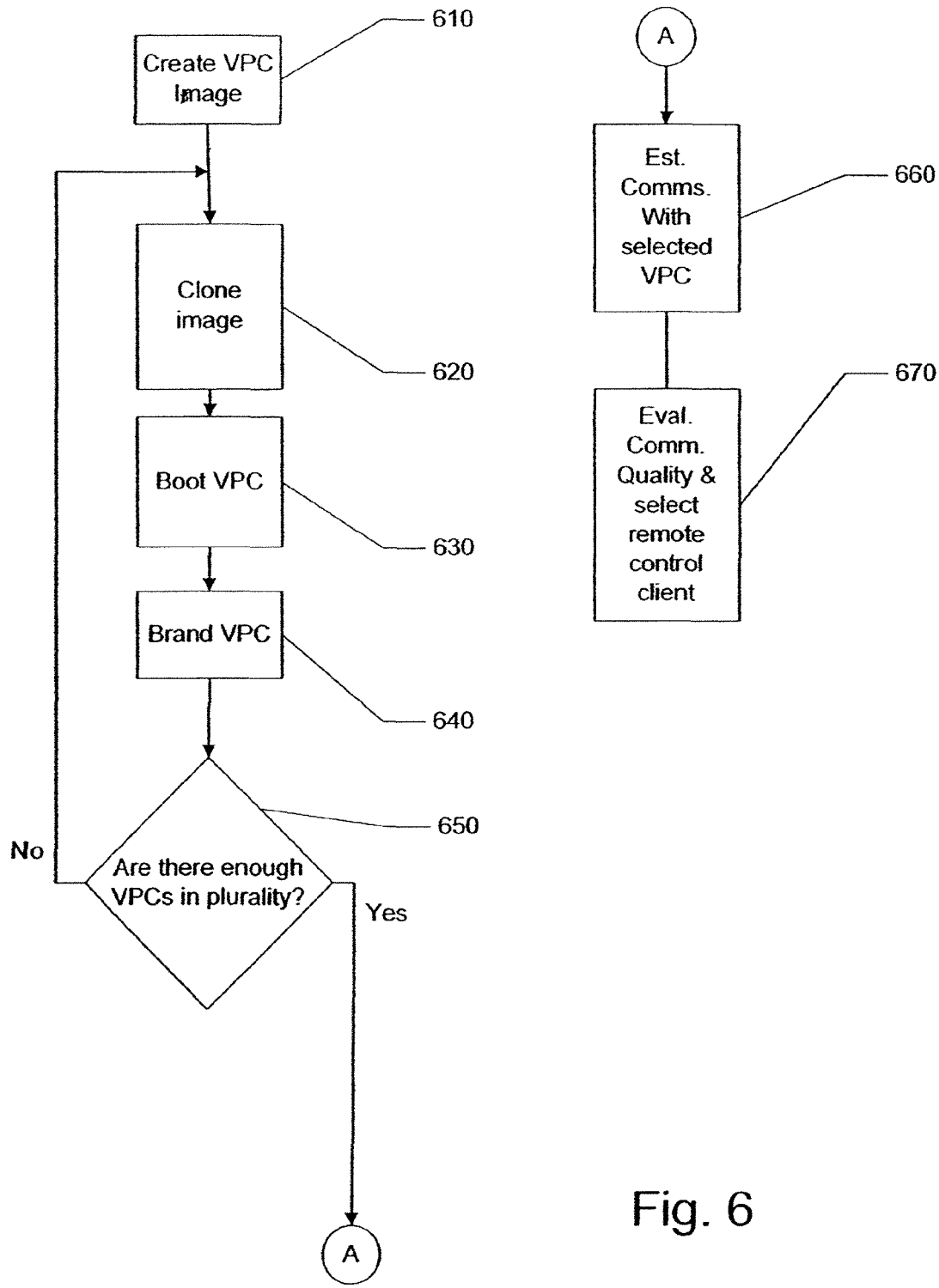
FIG. 6 is a flowchart that depicts a method of deploying and remotely accessing a virtual computer.

FIG. 6 is a flowchart that depicts a preferred method of deploying and remotely accessing a virtual computer. VPC 130/160's generation is orchestrated by commands generated from host control VPC 120 issued to remote process managers 125 and 155 in master virtual computer server 110 or slave virtual computer server 150 respectively.

As shown in FIG. 6, in step 610, a VPC image is created. In a preferred environment, a technician at Mission Control 190 generates VPC images from specifications required to run application program 340. Alternatively, an image author may create a VPC image.

In step 620, master virtual computer server 110 clones said image to create a VPC. The VPC is modified by instructions found in a package, described below, and by runtime parameters. In a preferred embodiment, host controller VPC 120 checks that each VPC shares the same base virtual hard drive, and configures the VPC to write changes to a new virtual hard drive. Preferably, during the boot process, key differentiation information passed directly into the VPC from cloning step 620 causes the VPC to brand itself in accordance with configuration parameters such as a unique MAC address, a unique computer name, and a unique IP address. Preferably, the computer name is randomly generated by the VPC during boot, but the name can also be assigned by host controller program 390. Preferably, the IP address is assigned by a firewall VPC through DHCP.

In step 630, the VPC is booted.

In step 640, the VPC is branded with unique identifying information. As explained above, this branding preferably takes place during the boot sequence.

In step 650, host controller VPC 120 checks that a sufficient number of VPCs have been generated for the plurality of VPCs 130/160. If not, steps 620 through 640 are repeated as necessary.

In step 660, in response to a request from client device 170/180, host control VPC 120 selects a VPC from the plurality of VPCs 130/160, and start up the selected VPC. Host control VPC 120 accomplishes this task by sending a command to the appropriate RPM 125/155 on master virtual computer server 110 or slave virtual computer server 150, respectively. In turn, RPMs 125/155 start the selected VPC.

In step 670, host control VPC 120 reports the IP address of the selected VPC to client device 170/180. Remote user interface 175/185 attempts to establish communications with the selected VPC. Client device 170/180 evaluates the quality of the communication connection to the selected VPC. Host control VPC 120 presents remote control communications protocols to remote user interface 175/185, and remote user interface will choose a protocol based on the quality of the communications connection in order to create the best possible experience for the user. Preferably, the user may choose to ovverride the automatic selection, based on user preferences such as responsiveness, picture quality, or bandwidth.

Mission Control Architecture and Operation

Figure 7B:
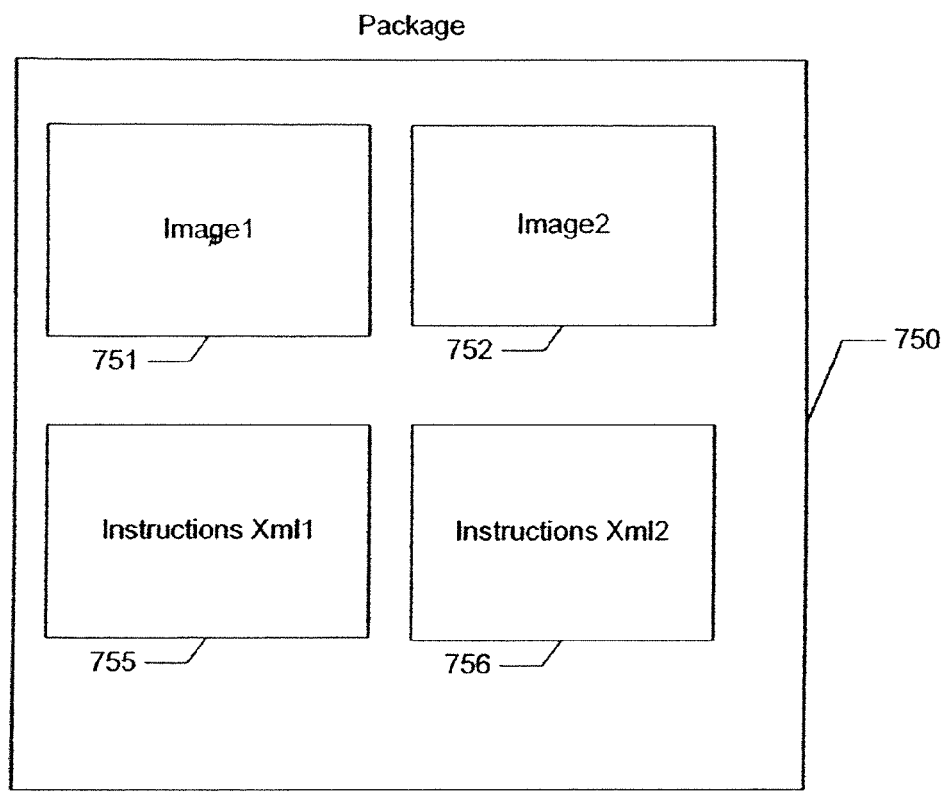
FIG. 7B is a block diagram that illustrates a package and associated components.
Figure 7A:
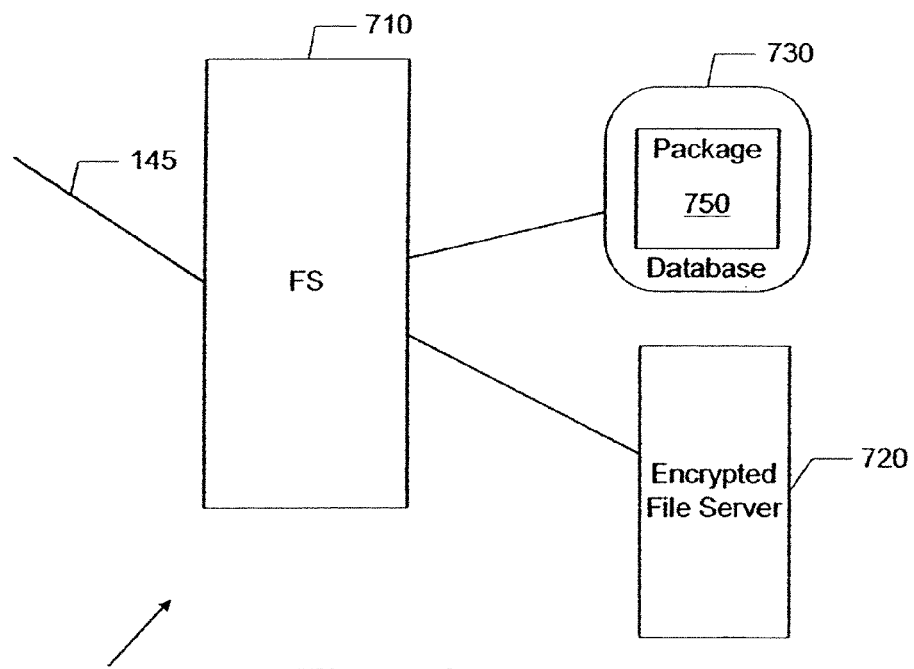
FIG. 7A is a block diagram that illustrates a collection of servers and data storage structures known as Mission Control.

FIG. 7A is a block diagram that illustrates a collection of servers and data storage structures known as Mission Control 190. Mission Control 190 comprises a collection of fileservers and databases used in virtual computer server system 100. FIG. 7A illustrates an exemplary embodiment of Mission Control 190, but one with skill in the art would understand that Mission Control may comprise many different combinations of fileservers 710, encrypted fileservers 720 and databases 730, that provide secure web services.

In a preferred embodiment, as shown in FIG. 7A, fileserver 710 is connected by communication link 145 to Internet 148. Fileserver 710 also comprises a database 730 containing a package 750. Preferably, fileserver 710 is connected to an encrypted fileserver 720.

In a preferred embodiment, fileserver 710 provides copies of remote user interfaces 175/185, which are downloaded and installed by client devices 170/180.

In a preferred embodiment, Mission Control 190 comprises an encrypted fileserver 720 that is used to store files and other information received from master virtual computer server 110 and slave virtual computer server 150 through said communication lines 145, network 140, and Internet 148.

In a preferred embodiment, database 730 contains one or more packages 750 and other information used to configure and maintain master virtual computer server 110 and slave virtual computer server 150. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

One primary purpose of Mission Control 190 is to generate one or more packages 750 containing images and instructions. As shown in FIG. 7B, package 750 comprises one or more images 751, 752 and instructions 755, 756. Images 751, 752 define VPCs described above. Instructions 755, 756 provide the necessary steps to install package 750 on servers 110/150. Preferably, instructions 755, 756 are written in a structured language such as XML.

Figure 8:
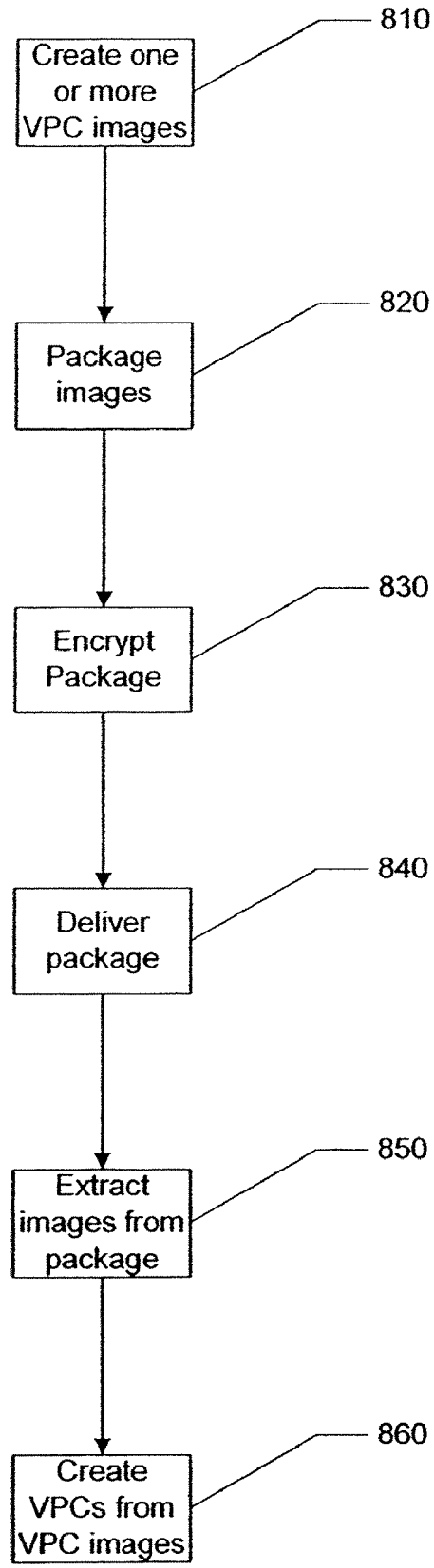
FIG. 8 is a flowchart that depicts a preferred embodiment of remotely creating one or more software-simulated computers.

FIG. 8 is a flowchart that depicts a preferred embodiment of remotely creating one or more software simulated computers. As shown in FIG. 8, in step 810, one or more VPC images are created at Mission Control 190.

Next, in step 820, images are packaged together along with instructions for installing the images. These instructions include dependencies between various VPCs that are created on master virtual computer server 110 and slave virtual computer server 150.

In step 830, package 750 is encrypted. Encryption is not a requirement, but in a preferred embodiment, encryption offers an additional level of security when transmitting package 750 across an insecure data network such as Internet 148.

In step 840, package 750 is delivered to master virtual computer server 110 or slave virtual computer server 150. The delivery method may take the form of an electronic transmission, or package 750 may be recorded on media 1001 et seq., described below, and installed locally from media onto master virtual computer server 110 or slave virtual computer server 150.

In step 850, master virtual computer server 110 or slave virtual computer server 150 extracts images 751, 752 from package 750.

In step 860, new VPCs are created from VPC images 751, 752 contained in package 750 in accordance with instructions 755, 756.

Booting up multiple VPCs is a complex process that must be carefully orchestrated by host controller VPC 120. Consequently, certain events must be successfully achieved before subsequent events are embarked. These dependencies are defined in instructions 755, 756 contained in package 750. XML instructions 755, 756 are scripts that orchestrate the complex dependencies involve with generating and maintaining VPCs 130/160.

As an example, consider the exemplary XML instruction listing for a watchdog process illustrated in FIGS. 9A and B. FIGS. 9A and B show instructions that cause RPMs 125/155 to perform the following tasks: (1) start a VMManager process that runs until 3 a.m.; (2) start a background downloader process that runs until 3 a.m.; (3) start an LCD Manager process that runs permanently; (4) restart any of the aforementioned processes if any one of them fails; (5) shutdown every process at 3:01 a.m.; (6) run an internal backup; and (7) restart a server 110/150.

In addition, Mission Control 190 is used to monitor connections of remote client devices 170/180 with master virtual computer server VPC 130 and slave virtual computer server VPC 160. Mission Control 190 maintains status of every connection for every VPC 130/160 and client device 170/180.

Finally, Mission Control 190 serves as a repository for storing a back up of master virtual computer server 110 and slave virtual computer server 150. Alternatively, the backup is stored on master virtual computer server 110 and slave virtual computer server 150.

In either backup storage case, a backup utility program is invoked by remote process manager 125, typically, once every evening. Preferably, the backup utility is executed after host controller VPC 120 has shut itself down. The utility checks for available storage space, and removes old backup copies as necessary. The backup utility generates a backup copy of the simulated storage devices for each VPC 130/160. In a preferred embodiment, the utility keeps one copy per day for a week, one copy per week for a month, one copy per month for a year, and an annual copy for as many years as storage space permits. After the backup utility has completed, remote process manager 125 starts a full warm reboot of master virtual computer server 110 and slave virtual computer server 150.

Delivery of Packages and Software on Media

Figure 10:
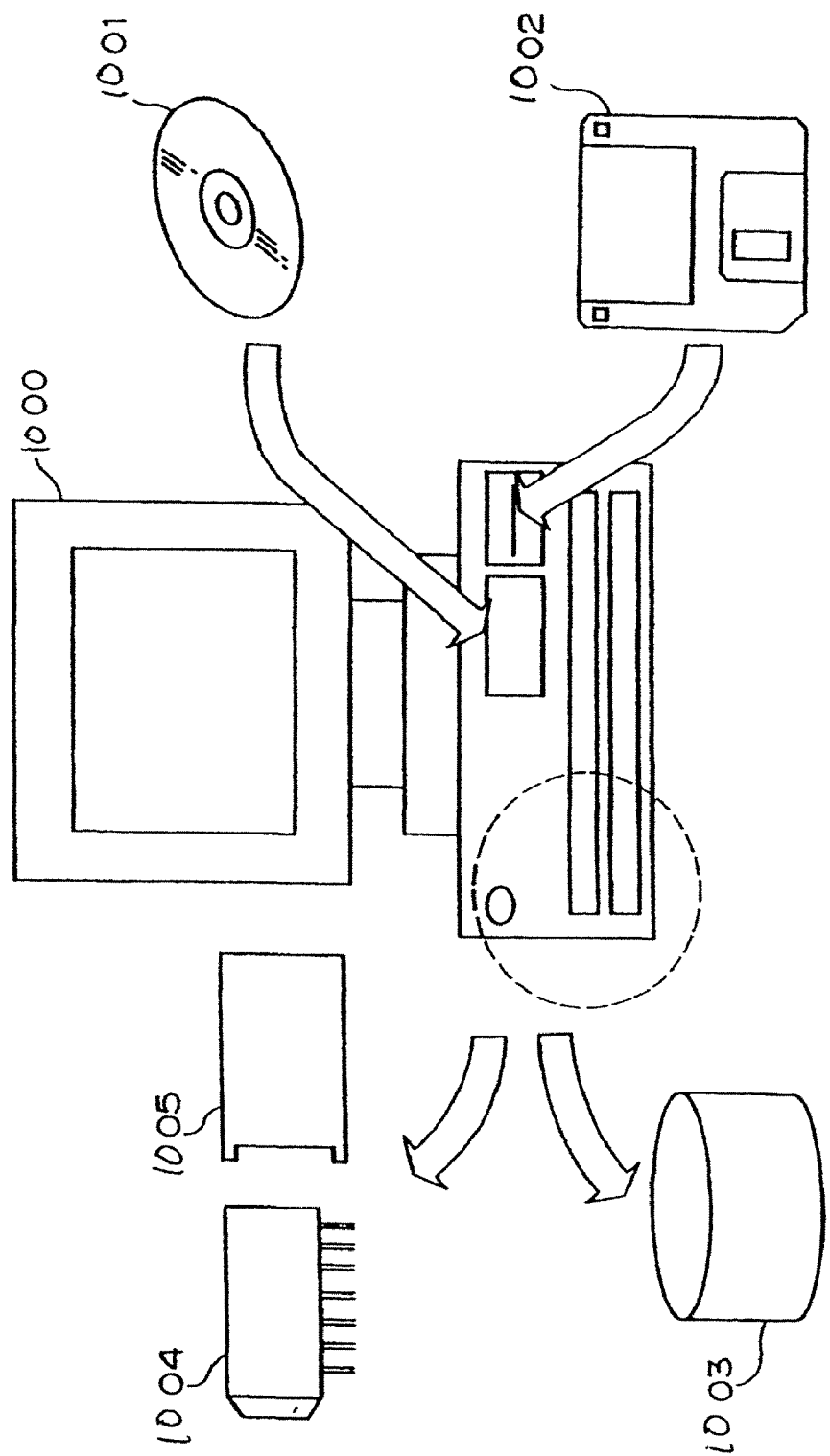
FIG. 10 is a block diagram that illustrates various types of media.

In the specification, the term "media" means any medium that can record data therein. Examples of a recording medium are illustrated in FIG. 10.

The term "media" includes, for instance, a disk shaped media for 1001 such as CD-ROM (compact disc-read only memory), magneto optical disc or MO, digital video disc-read only memory or DVD-ROM, digital video disc-random access memory or DVD-RAM, a floppy disc 1002, a memory chip 1004 such as random access memory or RAM, read only memory or ROM, erasable programmable read only memory or E-PROM, electrical erasable programmable read only memory or EE-PROM, a rewriteable card-type read only memory 1005 such as a smart card, a magnetic tape, a hard disc 1003, and any other suitable means for storing a program therein.

A recording media storing a program for accomplishing the above mentioned apparatus maybe accomplished by programming functions of the above mentioned apparatuses with a programming language readable by a computer 1000 or processor) and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device 1000, any suitable device for performing computations in accordance with a computer program may be used. Examples of such devices include a personal computer, a laptop computer, a microprocessor, a programmable logic device, or an application specific integrated circuit.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

The invention claimed is:

1. A software-simulated computer server for providing a client device access to an application program on a software-simulated computer through a network, comprising:
   one or more hardware computers;
   a bootable image that defines a software-simulated computer having a copy of said application program stored thereon; and
   a host control program that causes said one or more hardware computers to create a plurality of software-simulated computers from said bootable image and to generate unique, machine-differentiation information for each software-simulated computer in said plurality during a boot process; and
   wherein said host control program further causes said hardware computers to select a running software-simulated computer from said plurality, to negotiate a communication connection between said selected software-simulated computer and said client device, and to enable said client device to access said application program running on said selected software-simulated computer through said network; and
   wherein said host control program causes said one or more hardware computers shutdown, recreate, and restart said plurality of software-simulated computers.

2. The software-simulated computer server of claim 1, wherein said host control program further causes said one or more hardware computers to copy user generated data to backup storage.

3. The software-simulated computer server of claim 2, wherein said host control program recreates and restarts said plurality of software-simulated computers after said user generated data has been copied.

4. The software-simulated computer server of claim 1, wherein said host control program responds to client device requests using one or more communication protocols from a list comprising FTP, HTTP, HTTPS, MPLS, SFTP, SMTP, and SSH.

5. The software-simulated computer server of claim 4, wherein said application program is designed to be used on a single personal computer.

6. The software-simulated computer server of claim 4, wherein said application program is a client/server application.

7. The software-simulated computer server of claim 6, wherein said application program uses one or more communication protocols from a list consisting of IPX/SPX, NETBIOS, raw IP sockets, UDP/IP, TCP/IP, IPv6, IPSEC, HTTP, and NETBEUI.

8. The software-simulated computer server of claim 1, wherein said host control program balances load on said hardware computers when making said selection of said software-simulated computer.

9. The software-simulated computer server of claim 8, wherein said load is determined by one or more of available memory, processor utilization, and a number of unused software-simulated computers.

10. The software-simulated computer server of claim 1, wherein said software-simulated computer is adapted to accept and communicate with and to provide concurrent interaction of said application with more than one client device.

11. The software-simulated computer server of claim 1, wherein said software-simulated computer is adapted to record user input from said client device.

12. The software-simulated computer server of claim 1, further comprising a control center computer in communication with a host control virtual computer, wherein said control center computer transmits said image for said software simulated computer to said host control virtual computer.

13. The software-simulated computer server of claim 12, wherein said control center computer receives status information about a software-simulated computer.

14. The software-simulated computer system of claim 12, wherein said control center computer is adapted to issue a reboot command that causes a particular software-simulated computer to be shutdown, recreated, and restarted.

15. The software-simulated computer system of claim 12, wherein said control center computer transmits an updated image comprising an updated copy of said application program and said host control program causes said one or more hardware computers to shutdown, recreate using said updated image, and restart said plurality of software-simulated computers.

* * * * *